United States Patent
Miura

(10) Patent No.: US 6,429,874 B1
(45) Date of Patent: *Aug. 6, 2002

(54) IMAGE GENERATING APPARATUS AND METHOD

(75) Inventor: Katsuhiro Miura, Ichikawa (JP)

(73) Assignee: Namco Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,658

(22) PCT Filed: Jan. 16, 1998

(86) PCT No.: PCT/JP98/00132

§ 371 (c)(1),
(2), (4) Date: Sep. 14, 1998

(30) Foreign Application Priority Data

Jan. 17, 1997 (JP) .................................. 9-19917

(51) Int. Cl.$^7$ ................................ G06T 11/40
(52) U.S. Cl. .................. 345/589; 345/592; 345/692; 345/634
(58) Field of Search .............. 345/637, 634, 345/629, 589, 592, 593

(56) References Cited

U.S. PATENT DOCUMENTS

| | | | | |
|---|---|---|---|---|
| 4,918,625 A | * | 4/1990 | Yan | 364/522 |
| 4,992,781 A | * | 2/1991 | Iwasaki et al. | 340/747 |
| 5,202,672 A | * | 4/1993 | Nakamura et al. | 340/747 |
| 5,222,203 A | * | 6/1993 | Obata | 395/126 |
| 5,428,724 A | * | 6/1995 | Silverbrook | 395/135 |
| 5,463,728 A | * | 10/1995 | Blahut et al. | 395/158 |
| 5,487,145 A | * | 1/1996 | Marsh et al. | 395/162 |
| 5,594,850 A | * | 1/1997 | Noyama et al. | 395/135 |
| 5,687,306 A | * | 11/1997 | Blank | 395/135 |
| 5,745,095 A | * | 4/1998 | Parchem et al. | 345/114 |
| 5,764,229 A | * | 6/1998 | Bennett | 345/345 |
| 5,831,627 A | * | 11/1998 | Cohen | 345/431 |
| 5,900,877 A | * | 5/1999 | Weiss et al. | 345/356 |
| 5,923,333 A | * | 7/1999 | Stroyan | 345/422 |
| 5,947,823 A | * | 9/1999 | Nimura | 463/32 |
| 5,969,724 A | * | 10/1999 | Berry et al. | 345/429 |
| 5,977,977 A | * | 11/1999 | Kajiya et al. | 345/418 |
| 6,023,261 A | * | 2/2000 | Ugajin | 345/113 |
| 6,034,693 A | * | 3/2000 | Kobayashi et al. | 345/430 |
| 6,064,395 A | * | 5/2000 | Miura | 345/340 |
| 6,072,489 A | * | 6/2000 | Gough et al. | 345/345 |
| 6,104,377 A | * | 8/2000 | Ledoux | 345/150 |
| 6,118,427 A | * | 9/2000 | Buxton et al. | 345/113 |
| 6,356,281 B1 | * | 3/2002 | Isenman | 345/629 |

FOREIGN PATENT DOCUMENTS

| | | |
|---|---|---|
| JP | A-6-231275 | 8/1994 |
| JP | A-7-28986 | 1/1995 |
| JP | A-8-235379 | 9/1996 |

* cited by examiner

Primary Examiner—Matthew Luu
Assistant Examiner—Daniel J Chung
(74) Attorney, Agent, or Firm—Oliff & Berridge, PLC

(57) ABSTRACT

It is an object to provide an image generating apparatus and method which can perform a high-quality translucence process with reduction of the hardware scale and processing load. The translucence process is performed according to a first translucence information $OP_t$ used for performing the translucence control with respect to the respective portions of an object and a second translucence information $OP_m$ used for performing the translucence control with respect to the entire object. The translucence control according to $OP_m$ is invalidated with respect to a portion of the object that is judged to be opaque according to $OP_t$, that is, to be $OP_t=1$. For example, the translucence control may normally be carried out according to the relational expression of $OP_p = OP_m \times OP_t$. On the other hand, when a switching flag SFL is 0, $OP_p$ is fixed at 1 or the translucence process is omitted, with respect to the opaque portion. Thus, both portions to be subjected to the translucence control according to $OP_t$ and $OP_m$ and that to be opaque irrespectively of the value of $OP_m$, can coexist on the same object.

13 Claims, 8 Drawing Sheets

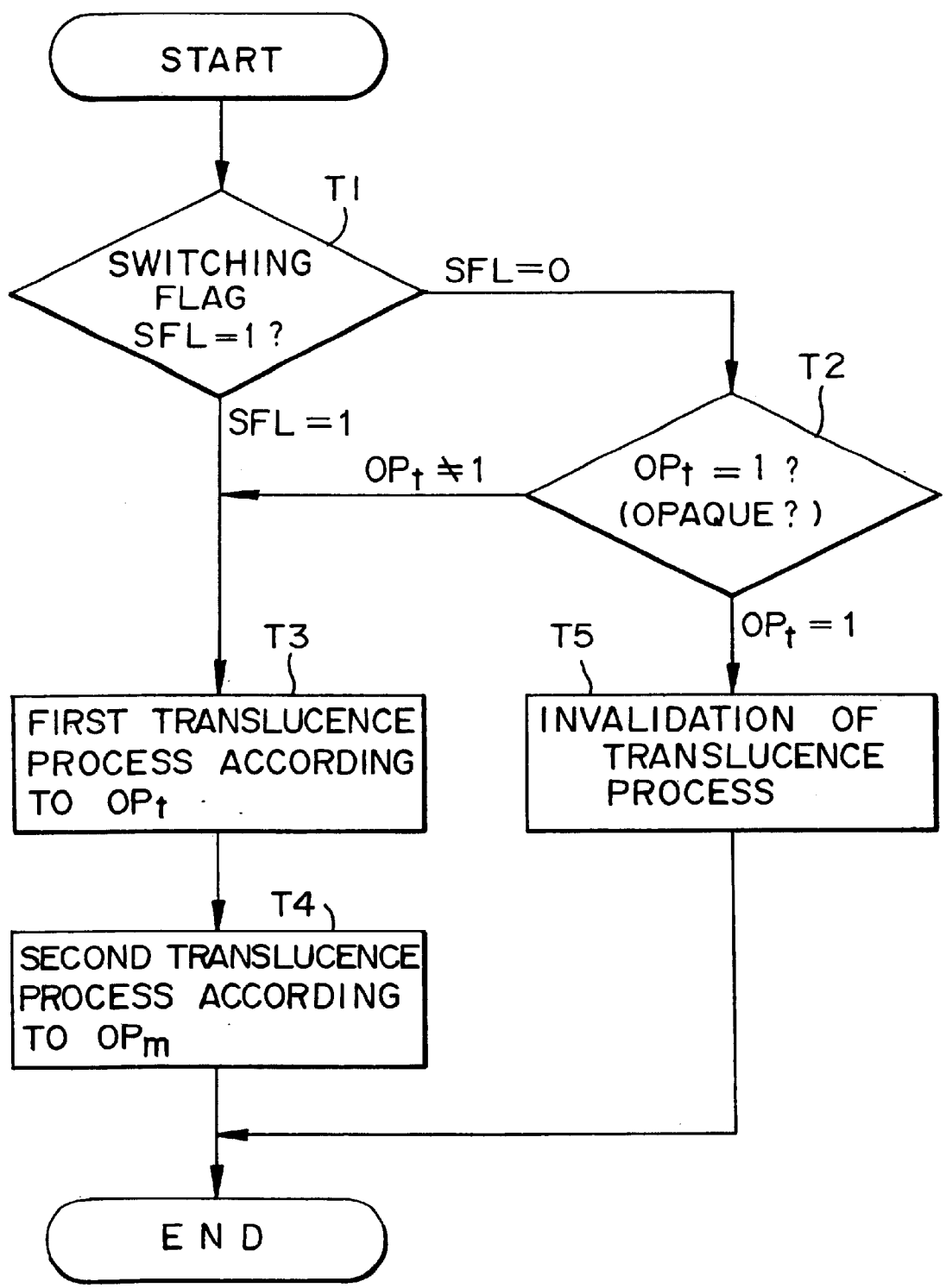

IMAGE GENERATING APPARATUS AND METHOD

TECHNICAL FIELD

The present invention relates to an apparatus and method for generating an image which can be translucently displayed.

BACKGROUND ART

There are known various types of image generating systems which can be used in game devices, image generating tools and others. Such image generating systems have an technical subject relating to how to improve the quality of image for realizing a so-called virtual reality. One of such techniques improving the quality of image is a technique known as a translucence process.

The translucence process provides image information for every pixel as by blending color information for a translucent display object with color information for the background. By means of the translucence process, the translucent object can be displayed to provide an image further improved in reality.

However, the conventional translucence process will cause all the portions of an object to be subjected to translucence control, for example, when the object such as a polygon or sprite is translucently drawn. When an opaque portion exists within the object, therefore, the opaque portion will also be subjected to translucence control. Therefore, the portion that should always be remained as opaque must be treated as a separate object. This leads to enlargement of the hardware scale and to increase of the processing load.

DISCLOSURE OF THE INVENTION

To overcome the aforementioned technical problem, it is thus an object of the present invention to provide an image generating apparatus and method which can perform a high-quality translucence process with reduction of the hardware scale and processing load.

To this end, the present invention provides an image generating system for performing a translucence process, comprising:

translucence process means for performing translucence process based on first translucence information and second translucence information, the first translucence information carrying out a translucence control to each portion of an object and the second translucence information carrying out the translucence control to entire portion of the object, and invalidation means for invalidating the translucence control according to at least the second translucence information with respect to a portion of the object that is judged to be opaque according to the first translucence information.

With the image generating apparatus of the present invention, the translucence process is executed based on the first and second translucence information. The first translucence information is used to perform the translucence control with respect to each portion of the object such as a polygon or sprite. The second translucence information is set for each object or scone (screen) and used to perform the translucence control with respect to entire portion of the object. The present invention invalidates the translucence control according to the second translucence information with respect to a portion to be opaque. At this time, the translucence control according to the first translucence information may be invalidated in addition to the translucence control according to the second translucence information. The invalidation of the translucence control may be carried out by various techniques such as a technique of varying the translucence information itself or a technique of omitting portion or all of the translucence process. The same object can simultaneously have a first portion left opaque by invalidating the translucence control according to the translucence information and a second portion normally subjected to the translucence control according to the first and second translucence information. More particularly, one object will not be divided into several objects such as a first object as the first portion and a second object as the second portion. The first portion left opaque irrespectively of the second translucence information and the second portion normally subjected to the translucence control can coexist on the same object. As a result, a high-quality translucent image can be obtained with small scale of hardware and less processing load.

As an aspect of the present invention, the translucence process means may also perform the translucence process based on third translucence information obtaining from the first and second translucence information, and the invalidation means may fix the third translucence information with respect to a portion of the object that is judged to be opaque according to the first translucence information irrespectively of the second translucence information.

With this aspect, the third translucence information is fixed with respect to the first portion that is judged to be opaque irrespectively of the second translucence information. Thus, the first portion can be opaqued without depending on the second translucence information. Particularly, the present invention can invalidate the translucence control according to the second translucence information through such a simple process of fixing the third translucence information. This can simplify the process and reduce the processing load.

As another aspect of the present invention, the translucence process means may perform first and second translucence processes according to the first and second translucence information respectively, and the invalidation means may invalidate at least the second translucence process with respect to a portion of the object that is judged to be opaque according to the first translucence information.

With this aspect, the second translucence process in the translucence process means is invalidated with respect to the first portion which is judged to be opaque. At this time, the first translucence process may be invalidated in addition to the second translucence process. The present invention can invalidate the translucence control according to the second translucence information through such a simple process of invalidating the translucence process. This can simplify the process and reduce the processing load.

As other aspect of the present invention, the object may be a polygon, the first translucence information may be used for performing the translucence control with respect to each part of the polygon, and the second translucence information may be used for carrying out the translucence control with respect to entire part of the polygon.

With this aspect, the same object can simultaneously have a portion being opaque irrespectively of the second translucence information and the second portion subjected to the translucence control according to the first and second translucence information, As further aspect of the present invention, the first translucence information may have been stored in a given texture information storage means together with at least one of color information, brightness information, surface shape information, reflectance information, refractive index information and depth information.

With this aspect, the first translucence information has beer stored in the texture information storage means as one of the texture information together with the color information and others. By changing the first translucence information for each portion of the object on which the texture is mapped, the color as well as the translucence can be represented with different designs for the respective object portions.

As one of the information used for representing the design of the object, such a first translucence information is required in addition to the color information and others. On the other hand, when it is desired to vary the translucence in the entire object, there is required the second translucence information used to perform the translucence control with respect to the entire object. When such two kinds of the different translucence information are used, the following problem will be raised. That is, when a portion of the object is to be opaqued in design according to the first translucent information, that portion may become translucence under influence of the translucence control according to the second translucence information. The present invention can avoid such a problem since the translucence control according to the second translucence information is invalidated with respect to the portion which is judged to be opaque according to the first translucence information.

As yet further aspect of the present invention, a process of invalidating the translucence control according to the second translucence information with respect to a portion judged to be opaque may be switchable to a process of validating the translucence control.

With the aspect of the present invention, the translucence control according to the second translucence information with respect to an opaque portion of the object can either be invalidated or validated. In other words, the operating mode can be switched between a mode in which the opaque portion of the object is left opaque irrespectively of the second translucence information and another mode in which the portion becomes translucent under the translucence control according to the second translucence information. This enables an image to be represented with variety.

BRIEF DESCRIPTION OF THE DRAWINGS

FIG. 6 is another flow chart illustrating the operation of the present embodiment.

BEST FORMS FOR CARRYING OUT THE INVENTION

An embodiment of the present invention will now be described with reference to the drawings.

The principle of the present embodiment will first be described referring to FIGS. 1A to 1F.

Figure 1A:
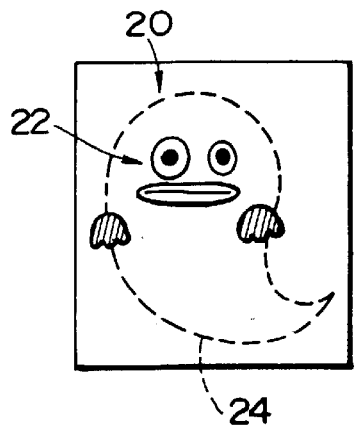
FIGS. 1A to 1F illustrate the principle of an embodiment of the present invention.
Figure 1B:
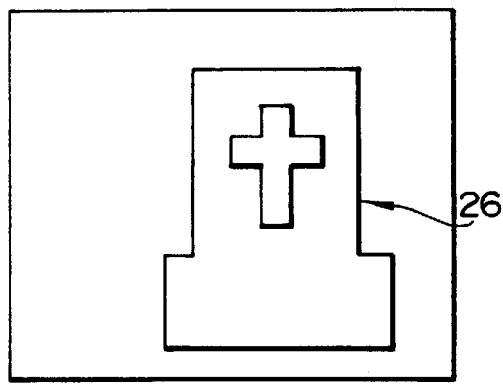
Figure 1C:
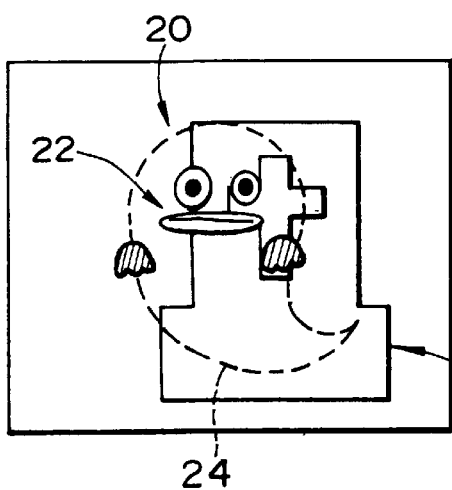

FIG. 1A shows a game character 20 representing a ghost. The game character 20 has opaque eyes, mouth and hands (eyes, mouth and hands will be together referred to the first portion 22) and a translucent body (body will be referred to the second portion 24). When the image of FIG. 1A is subjected to a translucence process such as blending with a background image 26 such as a gravestone in FIG. 1B, an image as shown in FIG. 1C and so on may be obtained.

The translucence process uses first translucence information used for performing a translucence control with respect to each portion of an object and second translucence information which is set for each object (e.g., a polygon or sprite) or each scene (screen) and used for performing the translucence control with respect to the entire object.

The translucence information may include transparency, opacity, codes for specifying the transparency and opacity and so on. However, the following description will be made mainly in connection with the opacity as translucence information. It will be assumed that the first translucence information is $OP_t$, the second translucence information is $OP_m$ and third translucence information obtained according to the first and second translucence information $OP_t$, $OP_m$ is $OP_p$.

Figure 2:
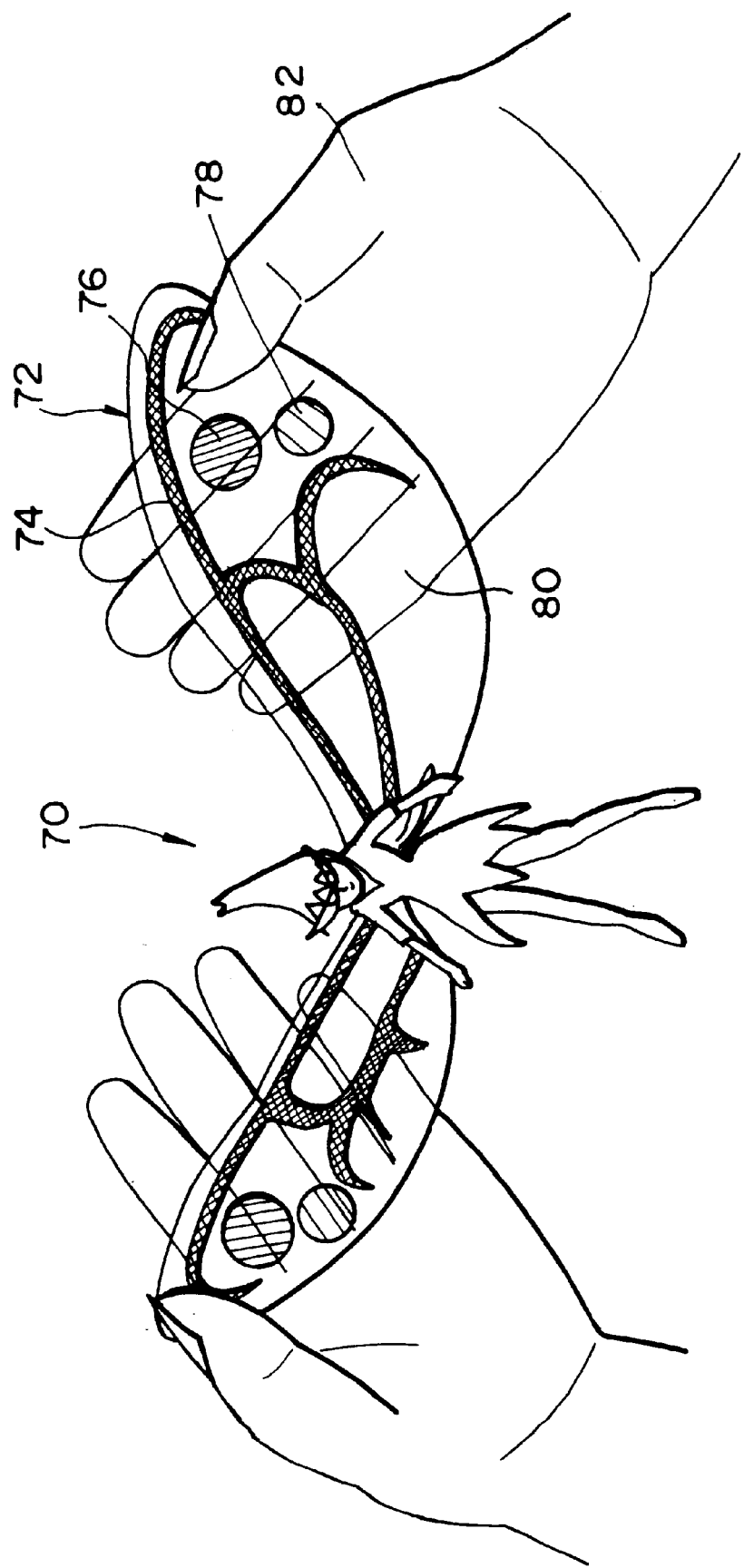
FIG. 2 illustrates the necessity of the first and second translucence information.

As one of the information for representing the design of an object, the first translucence information described above is required in addition to color information and others. In FIG. 2, for example, a fairy 70 has wings 72 designed with various patterns. A pattern 74 is green-colored and opaque while patterns 76 and 78 are blue colored and translucent. However, the opacity in the pattern 78 is smaller than that of the pattern 76. A pattern 80 is yellow-colored and translucent and has the smallest opacity. Although the hands 82 cannot be looked through the pattern 74 which is opaque, they can be looked through the patterns 76, 78 and 80 which are translucent. In such a manner, the design can be represented with reality and variety by varying the first translucence information with the color information.

On the other hand, the second translucence information described above is also required to perform the translucence control with respect to the entire object. For example, there may be a game scene in which the wings 72 of the fairy 70 are eliminated. In such a case, it is preferable that all the patterns 74, 76, 78 and 80 are to be translucent by varying the second translucence information.

Thus, two types of translucence information, that is, first and second translucence information are required for a realistic representation of the object pattern.

With texture mapping, the second translucence information will be stored in a texture information storage means such as texture memory as one of the texture information together with color information, brightness information, surface shape information (normal information and displacement information) reflectance information, refractive index information, depth information and the like.

Returning to the description of FIGS. 1A to 1F. Such an image as shown in FIG. 1C may be obtained by setting the first translucence information $OP_t$ of the first portion 22 that is opaque at 1.0 and the first translucence information $OP_t$ of the second portion 24 that is translucent at a given value (e.g., 0.6). Thus, the background 26 will be hidden by the first portion 22 while the background 26 can be looked through the second portion 24.

Figure 1D:
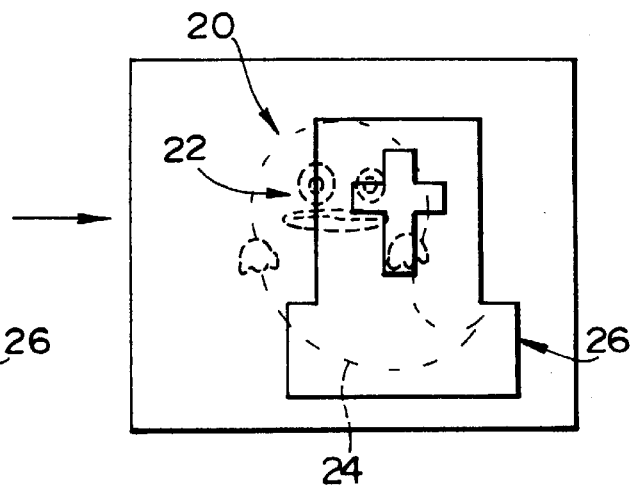

It will be described that the game character 20 representing a ghost is gradually disappearing on the screen. In such a case, normally, the second translucence information $OP_m$ is varied. For example, $OP_m$ may be changed from 1.0 to 0.5. As a result, because $OP_p=OP_m \times OP_t$ is normally established as a relational expression in the translucence process, $OP_p$ of the first portion 22 becomes $OP_m \times OP_t=0.5 \times 1.0=0.5$ while $OP_p$ of the second portion 24 becomes $OP_m \times OP_t=0.5=0.6=0.3$. This means that both the first and second portions 22, 24 become translucent as shown in FIG. 1D.

When a ghost or the like is represented, however, there may be a case that it is desirable for the first portion 22 including the eyes, mouth and hands to be left opaque. There may also be a case that it is desirable for the opacity in the first portion 22 to be varied after the change of the opacity of the second portion 24 with a certain time of delay. However, the technique in which the relationship of $OP_p=OP_m \times OP_t$ is always established is required to handle the first and second portions 22, 24 separately and to set the value of $OP_m$ for the respective portions so that the first portion 22 can be left opaque and the second portion 24 can be subjected to the translucence control or the opacity of the first portion 22 can be changed delaying to the opacity change of the second portion 24. More particularly, it is required that $OP_{m1}$ and $OP_{m2}$ for the first and second portions 22, 24 are set and that only $OP_{m2}$ is varied while leaving $OP_{m1}$ at 1.0. However, when the first and second portions 22, 24 are specified as two separate objects, the number of objects will be increased, leading to increase of the hardware scale and processing load.

Figure 1E:
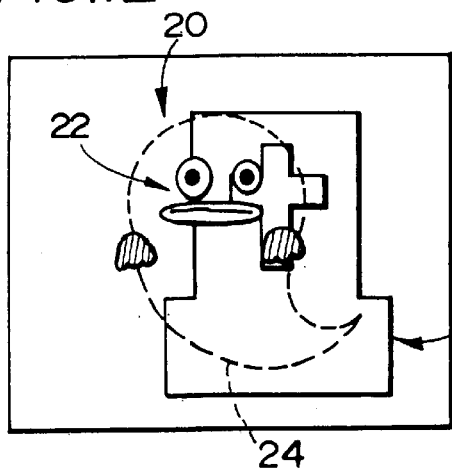
Figure 1F:
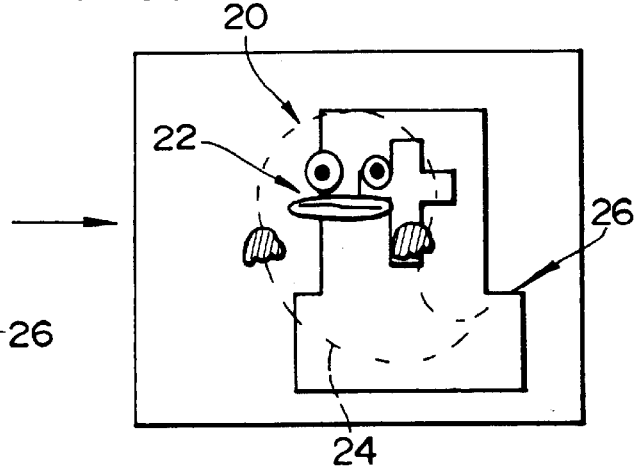

Therefore, this embodiment invalidates the translucence control according to the second translucence information $OP_m$ with respect to the first portion 22 that is judged to be opaque according to the first translucence information $OP_t$. As shown in FIGS. 1E and 1F, thus, the translucence control according to $OP_m$ becomes inoperative with respect to the first portion 22 so that only the second portion 24 can be subjected to the translucence control leaving the first portion 22 opaque. Furthermore, the opacity of the first portion 22 can be varied after the change of the opacity of the second portion 24 with a certain time of delay.

For example, it is now assumed that $OP_m$ is changed from 1.0 to 0.5 when $OP_t$ of the first and second portions 22, 24 are 1.0 and 0.6, respectively. At this time, $OP_p$ in the first portion 22 remains 1.0. On the other hand, $OP_p$ in the second portion 24 is varied from 0.6 to 0.3 according to the relational expression of $OP_p=OP_m \times OP_t$. If the translucence control according to $OP_m$ is validated with respect to the first portion 22 subsequently, the opacity of the first portion 22 can be varied with time delay. According to the present embodiment, it is not necessary to have separate objects for each of the first and second portions 22, 24. Therefore, such images as shown in FIGS. 1E and 1F can be represented while suppressing the increased hardware scale and) processing load.

It is further desirable that the translucence control according to the second translucence information $OP_m$ with respect to the first portion 22 will not always be invalidated arid may be switchable between the invalidating and validating modes. Thus, in the invalidating mode for the translucence control by $OP_m$, the first portion 22 can be opaque irrespectively of the value of $OP_m$, as shown in FIGS. 1E and 1F. On the other hand, the first portion 22 can be translucent according to the change of $OP_1$ in the validating mode, as shown in FIGS. 1C and 1D. This improves the variety in representing the image.

Figure 3:
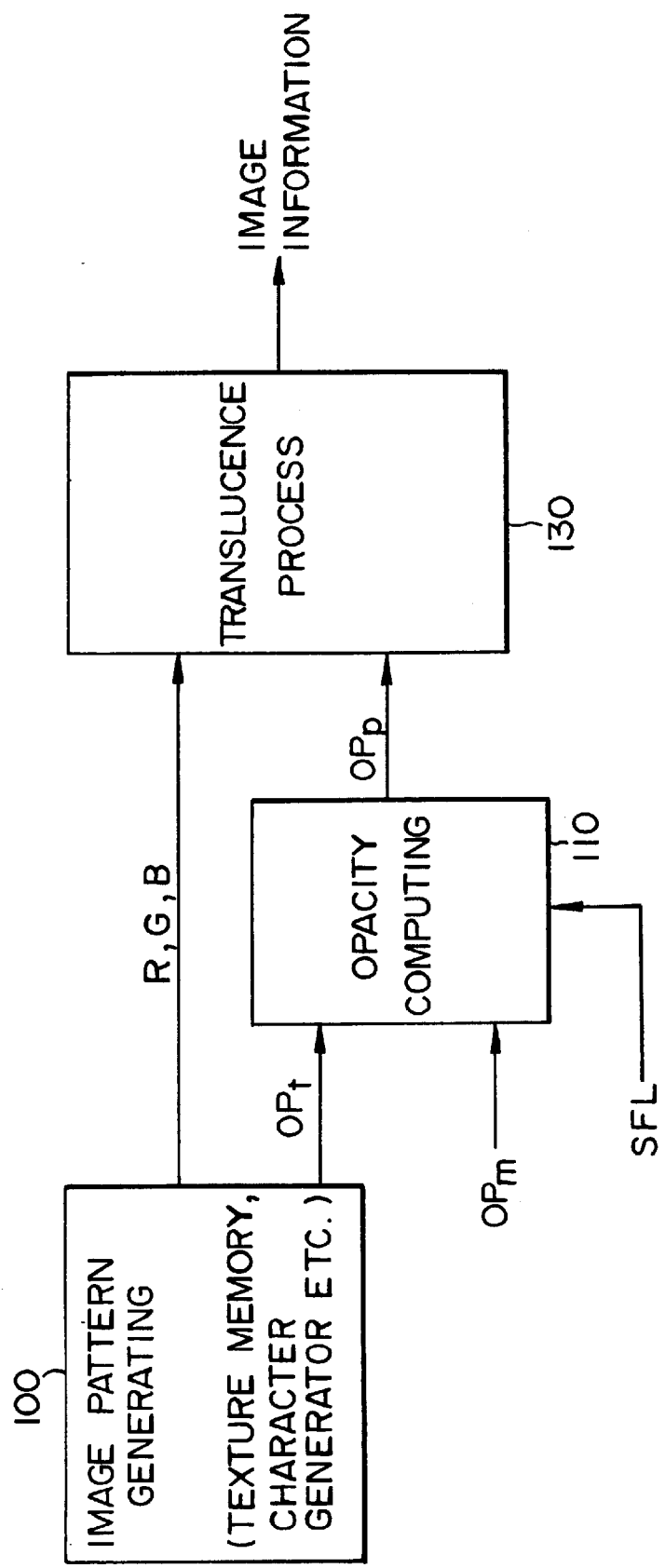
FIG. 3 is a functional block diagram of the present embodiment.

FIG. 3 is a functional block diagram of an image generating system according to the present embodiment, An image pattern generating unit 100 outputs color information R, G and B, translucence information $OP_t$ and so on. The image pattern generating unit 100 may be in the form of a texture memory, character generator or the like.

An opacity computing unit 110 computes third translucence information $OP_p$ based on the first and second translucence information $OP_t$, $OP_m$ from the image pattern generating unit 100. The function of the opacity computing unit 110 may be realized by the use of hardware such as an ASIC, CPU, DSP.

A translucence process unit 130 performs the translucence process based on $OP_p$, obtained by the opacity computing unit 110 and the color information A, G and B. The function thereof may be realized by the use of hardware such as an ASIC, CPU, DSP.

These are various kinds of the translucence process in the translucence process unit 130. With the blend technique, for example, the translucence process will be carried out according to the following formulas:

$$R_q=OP_1 \times R_T+(1-OP_1) \times R_x$$

$$G_q=OP_1 \times G_T+(1-OP_1) \times G_x, \text{ and}$$

$$B_q=OP_1 \times B_T+(1-OP_1) \times B_x$$

where $OP_1$ ($OP_p$) is an opacity in the blend technique; $R_T$, $G_T$ and $B_T$ are color information of a translucent object; $R_X$, $G_X$ and $B_X$ are color information of a background; and $R_Q$, $G_Q$ and $B_Q$ are color information obtained by the translucence process. Furthermore, $OP_1$ may be varied for R, G and B respectively.

In the filtering technique, the following formulas will be used:

$$R_Q=OP_2 \times F_R \times R_X;$$

$$G_Q=OP_2 \times F_G \times G_X; \text{ and}$$

$$B_Q=OP_2 \times F_B \times B_X;$$

where $OP_2$ is an opacity in the filtering technique; and $F_R$, $F_G$ and $F_S$ are filter factors of the translucent object.

The details of the process in the opacity computing unit 110, which is a essential part in the present embodiment, will now be described. The opacity computing unit 110 determines the third translucence information $OP_p$ in the following manner.

A flag SFL is used for determining whether or not the translucence control according to the second translucence information $OP_m$ should be carried out with respect to a portion that is judged to be opaque according to $OP_t$. By the use of such a flag SFL, the operation may be switched between a validation mode and invalidation mode for the translucence control according to $OP_p$ with respect to the opaque portion.

(1) With SFL=1,
   $OP_p=OP_m \times OP_t$;
(2) With SFL=0,
   (2)-1 when $OP_t$ is any value other than 1

$OP_p=OP_m \times OP_t$; and
   (2)-2 when $OP_t$ is equal to 1,
   $OP_p1$.

More particularly, the third translucence information $OP_p$ is fixed at 1 with respect to a portion that is judged to be opaque according to the first translucence information $OP_t$ without depending on the second translucence information $OP_m$. Thus, the translucence control according to $OP_m$ can be invalidated with respect to the portion that is judged to be opaque according to $OP_t$.

Figure 4:
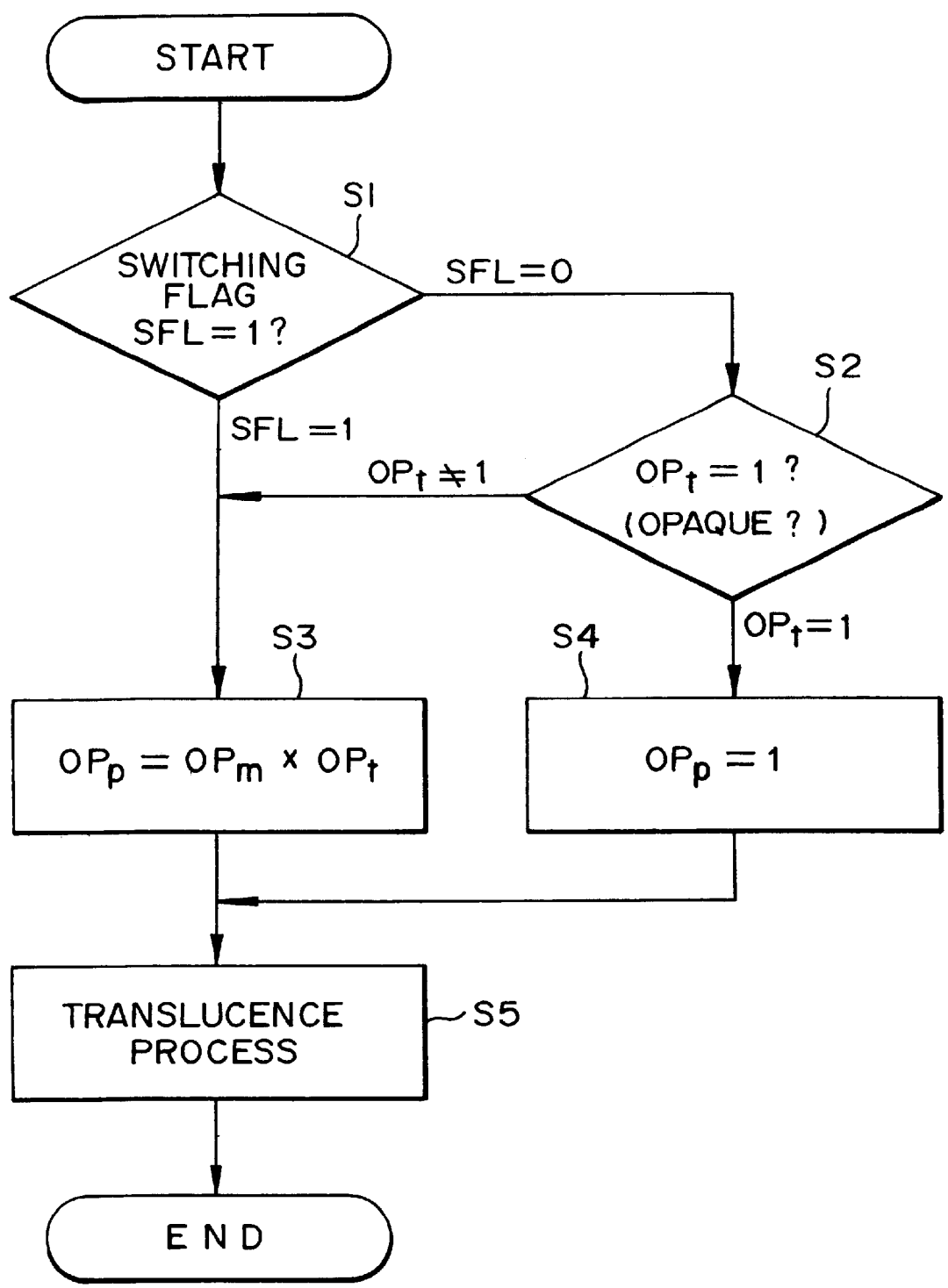
FIG. 4 is a flow chart illustrating the operation of the present embodiment.

FIG. 4 is a flow chart illustrating the operation of the present embodiment. It is first judged whether the switching flag SFL is 1 or 0 (Step S1). When SFL is 1, the third translucence information $OP_p$ is determined according to the relational expression of $OP_p=OP_m \times OP_t$. The translucence process is performed based on the determined $OP_p$ (Steps S3 and S5). When SFL is equal to 0, it is judged whether or not $OP_t$ is equal to 1 (Step S2). When $OP_t$ is not equal to 1, $OP_p$ is determined according to the relational expression of $OP_p=OP_m \times OP_t$, as described. The translucence process is then carried out based on the determined $OP_p$. On the other hand, when $OP_t$ is equal to 1, that is, when it is judged that the portion to be processed is opaque according to $OP_t$, $OP_p$ is fixed at one to perform the translucence process irrespectively of the value of $OP_m$ (Step S4).

For example, when the switching flag SFL is equal to 1, the first portion 22 (eyes, mouth and hands) and second portion 24 (body) will be subjected to the translucence control based on the relational expression of $OP_p=OP_m \times OP_t$ (Steps S1 and S3), as shown in FIGS. 1C and 1D. On the other hand, when SFL=0, the second portion 24 is subjected to the translucence control according to the relational expression of $OP_p=OP_m \times OP_t$ (Steps S2 and S3), but the first portion 22 remains opaque irrespectively of the value of $OP_m$ by fixing $OP_p$ at one (Step S4), as shown in FIGS. 1E and 1F.

Figure 5:
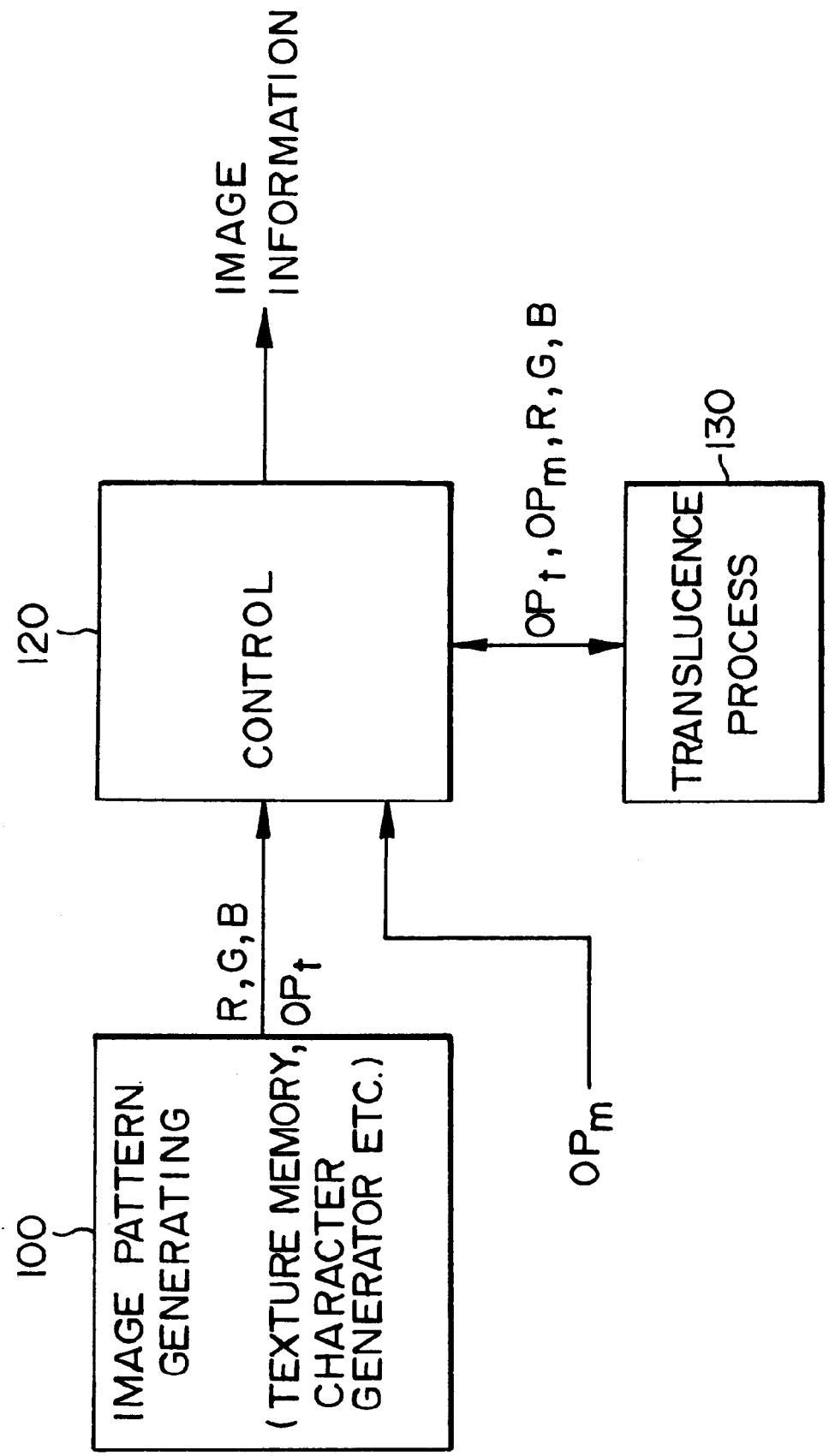
FIG. 5 is another functional block diagram of the present embodiment.

FIG. 5 is another functional block diagram of an image generating system according to the present embodiment.

A controlling unit 120 receives first and second translucence information $OP_t$, $OP_m$ and color information R, G and B to control the translucence process unit 130. The function of the controlling unit 120 may be realized by the use of hardware such as an ASIC, CPU, DSP.

Referring to FIG. 5, the translucence process unit 130 performs a first translucence process according to $OP_t$ and a second translucence process according to $OP_m$. The first translucence process can perform the translucence control with respect to each of the object portions separately. The second translucence process can uniformly perform the translucence control with respect to the entire object. To perform the first translucence process, the controlling unit 120 outputs the color information R, G and B and the first translucence information $OP_1$ toward the translucence process unit 130 and at the same time instructs the translucence process unit 130 to perform the first translucence process. In the same way, when the second translucence process is performed, the controlling unit 120 outputs the color information obtained by the first translucence process and the second translucence information $OP_m$ toward the translucence process unit 130 while, at the same time, instructing the translucence process unit 130 to perform the second translucence process.

In the present embodiment, at least the second translucence process is invalidated with respect to the portion of the object that is judged to be opaque according to $OP_1$. In this case, only the second translucence process may be invalidated or both the first and second translucence processes may be invalidated. The process of invalidating the first or second translucence process can be realized by not sending an instruction to the translucence process unit 130 to perform the first and second translucence processes from the control unit 120.

FIG. 6 is another flow chart illustrating the operation of the present embodiment. It is first judged whether the switching flag SFL is equal to 1 or 0 (Step T1). When SFL=1, the first translucence process according to $OP_t$ is carried out together with the second translucence process according to $OP_m$ (Steps T3 and T4). When SFL=0, it is judged whether or not $OP_t$ is equal to 1 (Step T2). When $OP_t$ is not equal to 1, the first and second translucence processes according to $OP_t$ and $OP_m$ are similarly performed as described above. On the other hand, when $OP_t$ is equal to 1, that is, when a portion to be processed is judged to be opaque, both the first and second translucence processes are invalidated (Step T5)

For example, when SFL=1, both the first and second portions 22, 24 are subjected to the first and second translucence processes according to $OP_t$ and $OP_m$ (Steps T1, T3 and T4), as shown in FIGS. 1C and 1D. On the other hand, when SFL=0, the first and second translucence processes are performed with respect to the second portion 24 (Steps T1, T3 and T4) while the first and second translucence processes are invalidated with respect to the first portion 22 (Step T5), as shown in FIGS. 1E and 1F. Therefore, the first portion 22 becomes opaque irrespectively of the value of $OP_m$.

Figure 7A:
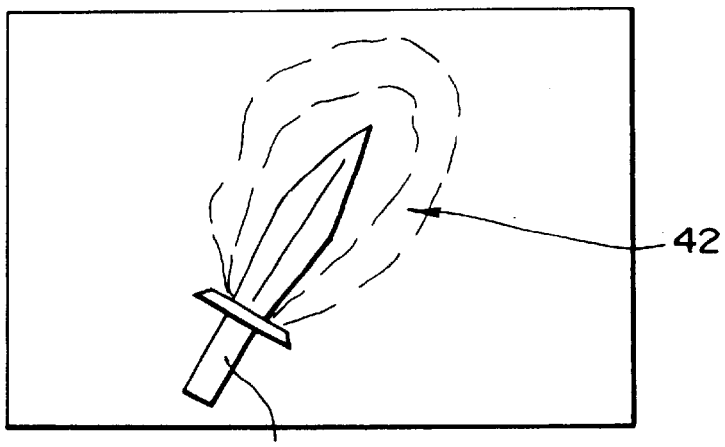
FIGS. 7A, 7B and 7C show images generated according to the present embodiment.
Figure 7B:
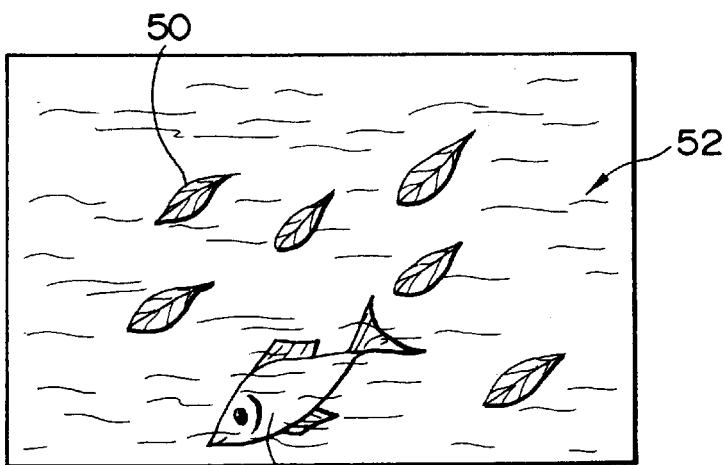
Figure 7C:
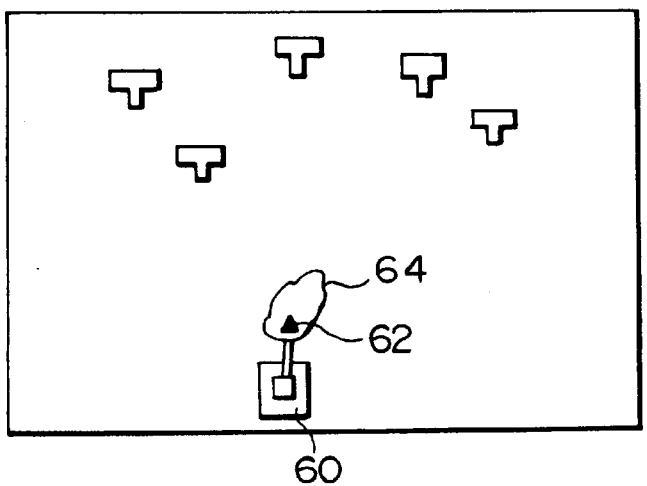

FIGS. 7A, 7B and 7C show images generated according to the present embodiment.

FIG. 7A is an example of an image that flames 42 are emitted from a sword 40. The sword 40 is opaque and the flames 42 are translucent. If the sword 40 and flames 42 are treated as the same object, the sword 40, which should be opaque, will also become translucent according to the relational expression of $OP_p=OP_m \times OP_t$ when $OP_m$ is changed to vary the opacity of the flames 42. According to the present embodiment, the sword 40 is left opaque and only the flames 42 are subjected to the translucence control even though the sword 40 and flames 42 are treated as the same object (or they are represented by a single and the same texture).

FIG. 7B shows an image in which fallen leaves 50 floating on water 52. The fallen leaves 50 are opaque. The water 52 is translucent, through which a fish 54 under water can be seen. By treating the fallen leaves 50 and water 52 as separate objects, the opacity of the water 52 can be varied while leaving the fallen leaves 50 opaque. However, a large number of fallen leaves 50 exist, this leads to enormous increase of the processing load. Although the portion of the water just below the fallen leaves 50 is not actually necessarily drawn, such a portion must be subjected to the drawing process if the fallen leaves 50 and water 52 are treated as separate objects. This degrades the processing efficiency. According to the present embodiment, only the water 52 can be subjected to the translucence control while leaving the fallen leaves 50 opaque by setting SFL=0, even if the fallen leaves 50 and water 52 are treated as the same object.

FIG. 7C shows an image that a tank 80 having a barrel from which a cannonball 62 is emitted with flames 62. This is an example of an image generated by an image generating system which outputs two-dimensional images. The cannonball 62 is opaque while the flames 4 are translucent. The cannonball 62 and flames 64 are represented by a so called sprite. According to the present embodiment, only the flames 64 can be subjected to the translucence control while leaving the cannonball 62 opaque by setting SFL=0, even if the cannonball 62 and flames 64 are treated as the same sprite. In such a case, the image pattern generating unit 100 of FIGS. 3 or 5 is in the form of a character generator for generating the image pattern of a stripe.

Figure 8:
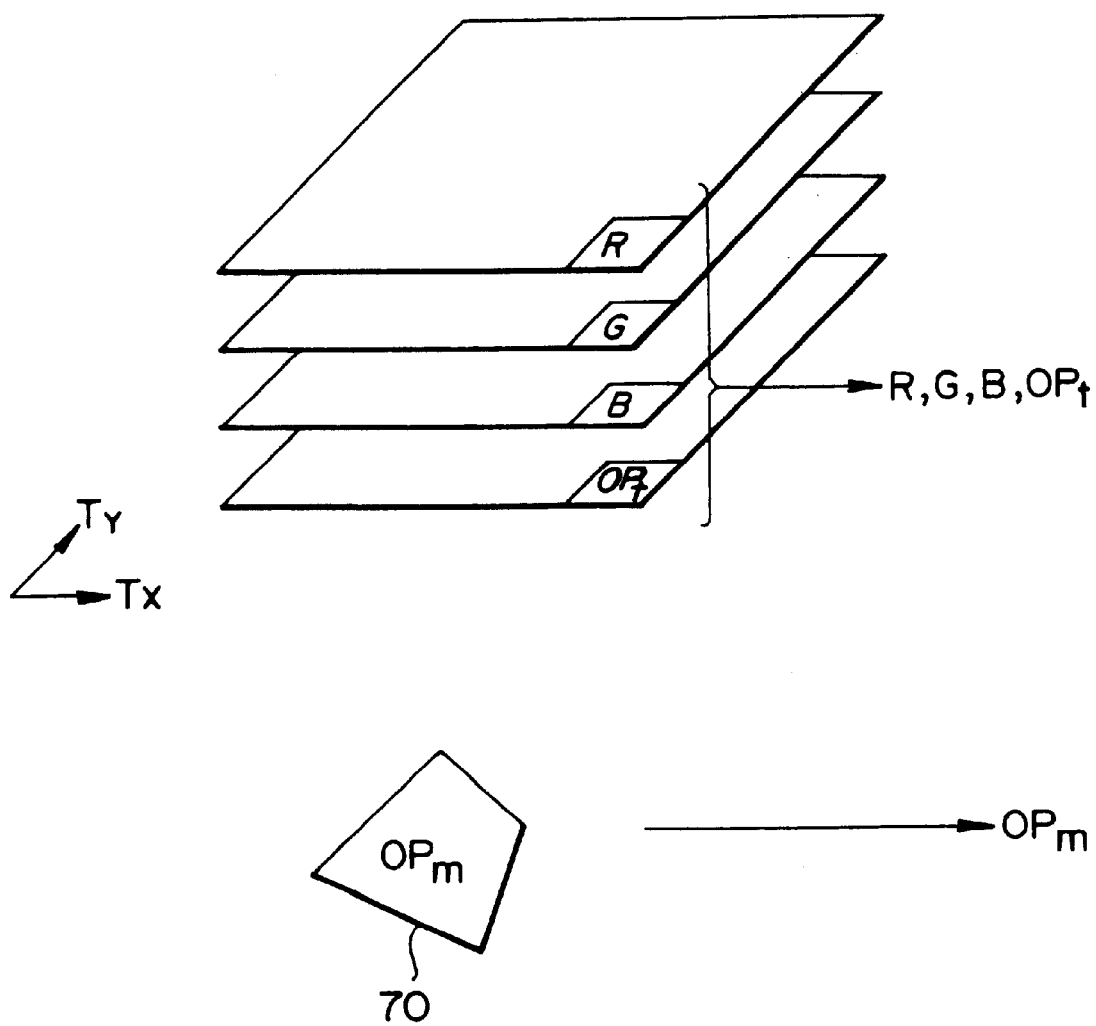
FIG. 8 illustrates a texture mapping to which the present embodiment is applied.

When an object is represented by one or more polygons and these polygons are mapped with a texture such as a pattern, the image pattern generating unit 100 of FIGS. 3 and 5 is in the form of a texture memory (or texture information storage means). As shown in FIG. 8, texture information including the color information R, G and B and the first translucence information $OP_t$ have been stored in the texture memory at the respective addresses position that are specified by texture coordinates $T_X$ and $T_Y$. The texture information stored in the texture memory may includes various other information, such as brightness information, surface shape information, reflectance information, refractive index information, and depth information. The second translucence information $OP_m$ is set for every polygon 70 to control the opacity in the entire polygon 70. The present embodiment can provide a high-quality image with a small number of polygons since both the portion subjected to the translucence control according to $OP_t$ and $OP_m$, and the portion to be opaque irrespectively of the value of $OP_m$ can coexist in the same object.

The present invention is not limited to the aforementioned embodiments, but may be carried out in any other various forms.

For example, the technique of invalidating the translucence control according to the second translucence information with respect to the portion that is judged to be opaque according to the first translucence information is not limited to such techniques as shown in FIGS. 3 and 5, but may be realized by any of various other equivalent structures.

Although the present invention is particularly effective for generating three-dimensional images represented by primitive surfaces such as polygons or free-form surfaces, it may be applied to any other various image generations.

What is claimed is:

1. An image generating apparatus for performing a translucence process, comprising:

translucence process means for performing translucence process between an object and its background based on first translucence information and second translucence information, said first translucence information carrying out a translucence control to each portion of the object and said second translucence information carrying out the translucence control for the entire object, and invalidation means for invalidating the translucence control based on at least said second translucence information with respect to a portion of the object previously judged to be opaque by said first translucence information.

2. The image generating apparatus according to claim 1, wherein said translucence process means performs the translucence process based on third translucence information obtained from said first and second translucence information, and said invalidation means fixes said third translucence information with respect to a portion of the object that is judged to be opaque according to said first translucence information irrespective of said second translucence information.

3. The image generating apparatus according to claim 1, wherein said translucence process means performs first and second translucence processes according to said first and second translucence information respectively, and said invalidation means invalidates at least said second translucence process with respect to a portion of the object previously judged to be opaque by said first translucence information.

4. The image generating apparatus according to claim 1, wherein said object is a polygon, said first translucence information is used for performing the translucence control with respect to each part of the polygon, and said second translucence information is used for carrying out the translucence control with respect to the entire polygon.

5. The image generating apparatus according to claim 2, wherein said object is a polygon, said first translucence information is used for performing the translucence control with respect to each part of the polygon, and said second translucence information is used for carrying out the translucence control with respect to the entire polygon.

6. The image generating apparatus according to claim 3, wherein said object is a polygon, said first translucence information is used for performing the translucence control with respect to each part of the polygon, and said second translucence information is used for carrying out the translucence control with respect to the entire polygon.

7. The image generating apparatus according to claim 1, wherein said first translucence information has been stored in a given texture information storage means together with at least one of color information, brightness information, surface shape information, reflectance information, refractive index information and depth information.

8. The image generating apparatus according to claim 2, wherein said first translucence information has been stored in a given texture information storage means together with at least one of color information, brightness information, surface shape information, reflectance information, refractive index information and depth information.

9. The image generating apparatus according to claim 3, wherein said first translucence information his been stored in a given texture information storage means together with at least one of color information, brightness information, surface shape information, reflectance information, refractive index information and depth information.

10. The image generating apparatus according to claim 1, wherein a process of invalidating said translucence control according to the second translucence information with respect to a portion previously judged to be opaque is switchable to a process of validating said translucence control.

11. The image generating apparatus according to claim 2, wherein a process of invalidating said translucence control according to the second translucence information with respect to a portion previously judged to be opaque is switchable to a process of validating said translucence control.

12. The image generating apparatus according to claim 3, wherein a process of invalidating said translucence control according to the second translucence information with respect to a portion previously judged to be opaque is switchable to a process of validating said translucence control.

13. An image generating method for performing a translucence process, wherein:

the translucence process is performed between an object and its background based on first translucence information and second translucence information, said first translucence information carrying out a translucence control to each portion of the object and said second translucence information carrying out the translucence control to the entire object, and the translucence control according to at least said second translucence information is invalidated with respect to a portion of the object previously judged to be opaque based on said first translucence information.

* * * * *